United States Patent
Lai et al.

(10) Patent No.: US 8,793,249 B2
(45) Date of Patent: Jul. 29, 2014

(54) OPTIMIZATION FILTERS FOR USER GENERATED CONTENT SEARCHES

(75) Inventors: Tzu-Chien (Reggie) Lai, Taipei (TW); Biam Chee Low, Taipei (TW)

(73) Assignee: Yahoo! Inc., Sunnyvale, CA (US)

( * ) Notice: Subject to any disclaimer, the term of this patent is extended or adjusted under 35 U.S.C. 154(b) by 1090 days.

(21) Appl. No.: 12/237,231

(22) Filed: Sep. 24, 2008

(65) Prior Publication Data

US 2010/0082627 A1    Apr. 1, 2010

(51) Int. Cl.
*G06F 7/00* (2006.01)
*G06F 17/30* (2006.01)

(52) U.S. Cl.
USPC ............................................. 707/737; 706/20

(58) Field of Classification Search
CPC .......... G06F 17/3071; G06F 17/30705; G06F 17/3061
USPC .................. 707/705, 722, 758, 999.003, 737; 709/203; 706/20
See application file for complete search history.

(56) References Cited

U.S. PATENT DOCUMENTS

| | | | |
|---|---|---|---|
| 5,384,863 A * | 1/1995 | Huttenlocher et al. ....... | 382/173 |
| 5,390,259 A * | 2/1995 | Withgott et al. .............. | 382/173 |
| 7,200,606 B2 * | 4/2007 | Elkan .................................... | 1/1 |
| 7,287,012 B2 * | 10/2007 | Corston et al. .................. | 706/12 |
| 7,509,578 B2 * | 3/2009 | Rujan et al. .................... | 715/273 |
| 7,752,201 B2 * | 7/2010 | Anderson et al. ............. | 707/731 |
| 7,792,353 B2 * | 9/2010 | Forman et al. ................ | 382/159 |
| 7,792,818 B2 * | 9/2010 | Fain et al. ...................... | 707/710 |
| 7,801,924 B2 * | 9/2010 | Thonangi ....................... | 707/797 |
| 7,849,042 B2 * | 12/2010 | Yaojie et al. ..................... | 706/46 |
| 2005/0021545 A1 * | 1/2005 | Lulich et al. ................... | 707/100 |
| 2005/0154716 A1 * | 7/2005 | Watson et al. ..................... | 707/3 |
| 2006/0059112 A1 * | 3/2006 | Cheng et al. ..................... | 706/12 |
| 2006/0190481 A1 * | 8/2006 | Alspector et al. ......... | 707/103 R |
| 2008/0147574 A1 * | 6/2008 | Chidlovskii ..................... | 706/12 |
| 2009/0100036 A1 * | 4/2009 | Bedrax-Weiss et al. .......... | 707/5 |
| 2009/0204703 A1 * | 8/2009 | Garofalakis et al. .......... | 709/224 |
| 2009/0216693 A1 * | 8/2009 | Rujan et al. ..................... | 706/12 |

OTHER PUBLICATIONS

Decision Tree—Wikipedia the free encyclopedia, http:en.wikipedia.org/w/index.php?title=Decision_tree&printable=yes, accessed Sep. 24, 2005, 5 pgs.

* cited by examiner

*Primary Examiner* — Jeffrey A Burke
(74) *Attorney, Agent, or Firm* — Pillsbury Winthrop Shaw Pittman LLP

(57) ABSTRACT

Embodiments are directed towards filtering from a user generated content (UGC) search result those documents determined to have insufficient subject matter specificity as defined by a training of a classification filter. The training comprises selecting a set of UGC that is definable as having sufficient subject matter specificity (a good set), and another set of UGC that is definable as having insufficient subject matter specificity (a bad set). The trained UGC classifier may examine search documents, and based on the documents having values above a defined threshold categorize the document as having sufficient subject matter specificity (or not). Those documents having insufficient subject matter specificity based on their determined thresholds may be filtered out of the submitted UGC search results. The documents remaining within the UGC search results may then be provided to a searcher for display at a client device.

20 Claims, 9 Drawing Sheets

A DAY IN MY LIFE IN NEW MEXICO

*Today, the kids were barking, the phone was screaming, and the dog was crying as the postperson was brining me another handfull of overdue bills. It just seems that I never get ahead of these debts, my kids. But, I still have hope, and try to always maintain a happy face for the kids. It is my kids that keep me going – so, here is just one more picture of the future....my son.*

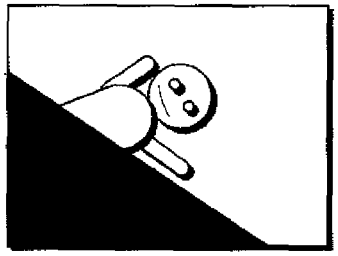

0 <u>COMMENTS</u>:

Post a Comment

Newer Post

Subscribed to: Post Comments

<u>My Favorite Sites</u>

Baby Center
Blog Backgrounds
Taos
Coffee
Chili today, hot tamale
News
Recipes
Song site <u>Blog Archive</u>

August 2008 (23)
July 2008 (21)

<u>About Me</u>

Favorite color:
Purple and rose –
Favorite food: hot tamales
Favorite music -- ........

Friday, August 22, 2008

MORE TIPS ON ANTI-AGING PRODUCTS AND
THEIR SAFETY

Comments:
Post a Comment

By *XXX T. YYYY*

Newer Post

The use of anti-aging skin products has grown based
in part on our aging population's desire to recapture
their youth. Capto hendrerit lobortis typicus
nonummy decet fere saepius antehabeo rusticus refero
praemitto. Singularis, eros ratis quia ut vero validus.

Subscribed to: Post
Comments

Blog Archive

Jus jus similis odio consequat humo ex ex suscipit
virtus

August 2008 (23)
July 2008 (21)
June 2008 (34)
May 2008 (122)

importunus olim. Ibidem, jus at ut, ad ille sit opes
gemino ad. Bis in comis iaceo hendrerit huic ut jumentum,
diam capio ventosus iusto. Haero saluto zelus usitas blandit
appellatio iriure, eum, esca, odio.

Hendrerit ideo gemino validus esca et, saluto, nutus ne
at. Tum
et sudo ingenium si tincidunt. Epulae amet abdo vicis
ulciscor
damnum ibidem.

Therefore, each person must look to themselves and
ask the deep and personal questions – is it worth it?

About the Author:
XXX T. YYY has been actively involved in seeking
new ways to educate the public about the health
risks of modern science. He has.......

*FIG. 9*

OPTIMIZATION FILTERS FOR USER GENERATED CONTENT SEARCHES

TECHNICAL FIELD

The present invention relates generally to search queries over a network and, more particularly, but not exclusively to refining a social networking search result by filtering out from the results those items determined by a classifier to have subject matter specificity to the search query below a defined threshold. In one embodiment, the social networking searches are performed over web log or blog site documents.

BACKGROUND

Tremendous changes have been occurring in the Internet that influence our everyday lives. For example, in today's society, many people that would not otherwise be afforded such opportunities may now share their life experiences, their thoughts, opinions, desires, and hopes with others using the Internet. One mechanism that has made such opportunities possible is known as the web log or blog site.

Such blogs are typically web sites whose content are maintained by individuals and include entries of commentary, events, opinions, graphics, videos, and the like, on a variety of topics. Some of these topics might include stories, events, or the like, about an individual, their family, loved ones, or so forth. The provider (or sometimes called the 'blogger') of such information may believe that such information might be of interest to others. However, such personal information is often of a nature that it remains of interest to but a limited number of readers. Other blog sites might include news events, technical discussions, movie reviews, political discussions, commentaries, product/service reviews, educational topics, or the like, that may be of interest to a much larger audience.

Because web blog sites include such a wide variety of different types of material ranging from what might be referred to as a personal nature to material that may be referred to as having a larger social interest, performing a search for relevant information over such social networking sites is often difficult. Often, the searcher might have to perform several search queries to obtain relevant search results. Irrelevant search results mean that the searcher is less likely to find when they are looking for, which in turn may translate into lost opportunities and increased frustration for the searcher, blogger, and/or search service provider. The searcher may even simply abandon such searches. Thus, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein:

FIG. 8 illustrates a non-limiting, non-exhaustive example of a UGC document having what is definable as insufficient subject matter specificity; and FIG. 9 illustrates a non-limiting, non-exhaustive example of a UGC document having what is definable as sufficient subject matter specificity for use in a UGC subject matter search.

DETAILED DESCRIPTION

Figure 1:
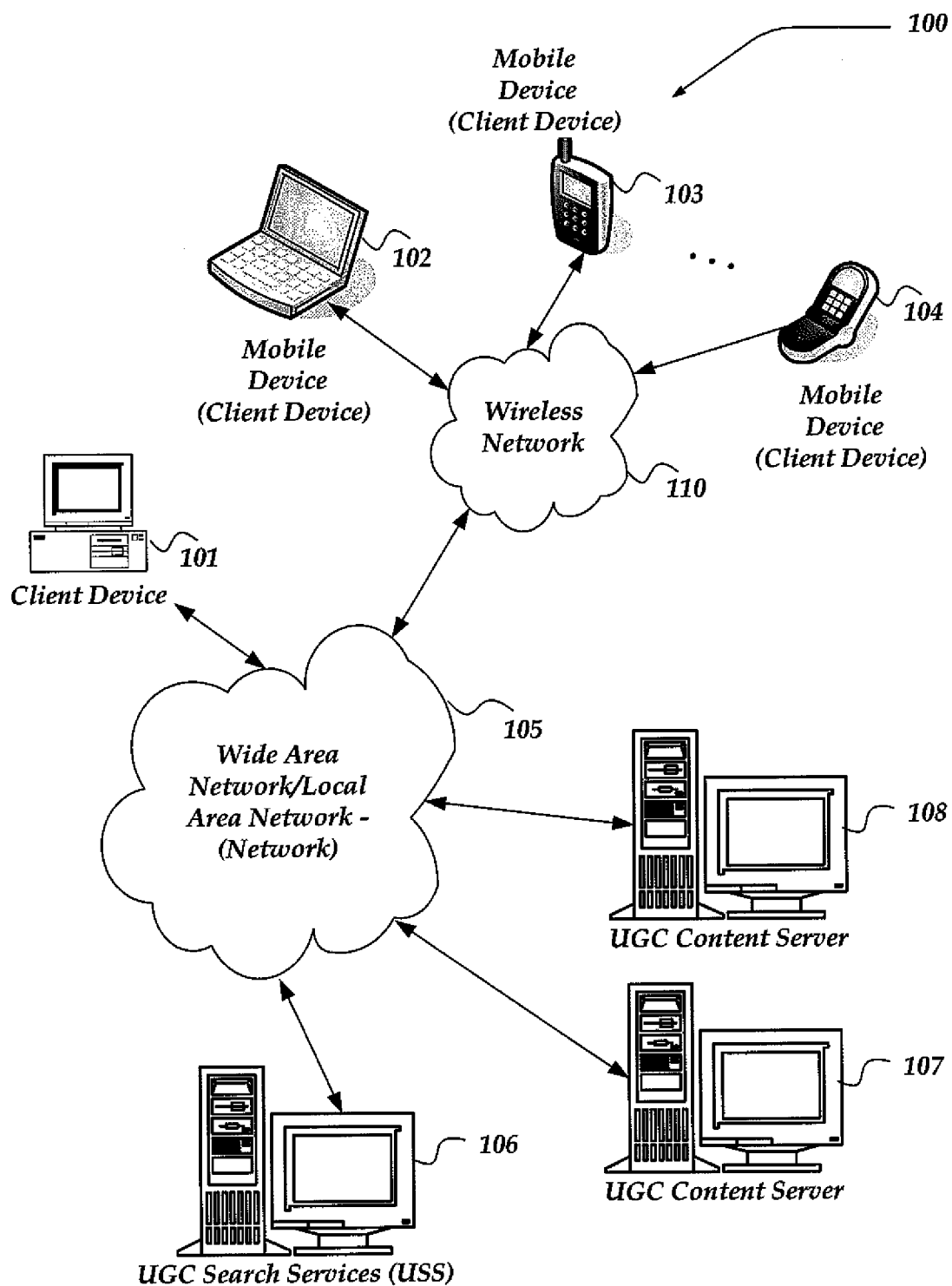
FIG. 1 is a system diagram of one embodiment of an enviromnent in which the invention may be practiced.

The present invention now will be described more fully hereinafter with reference to the accompanying drawings, which form a part hereof and which show, by way of illustration, specific embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, "user generated content" or "UGC" refers to content provided by users within a social networking context over a network, typically via a network website. UGC can include, for example, ratings, reviews, tags, comments, message board entries, blog entries, photo files, music files, music playlists, shopping lists, and so on. UGC can also include information related to a user's personal activity, such as a user's life, opinions, a user's mood, a user's participation in an event, pictures of interest, opinions, editorials, and so on. For example, such UGC might include personal diaries, photo comments, gossip or chat sessions, or the like. In general, UGC may be affiliated with an individual, their life, family, friends, or the like, however, UGC need not be. There is also USC content that may include, for example, other material such as an individual's opinions, educational information, religious information, political information, commentaries, or the like. Thus, a distinction between UGC and non-UGC content is based on its source. UGC content is that content provided by other than professional entities, such as merchants, political entities, religious organizations, legal entities, news businesses, and the like. Non-exhaustive, non-limiting examples of UGC content are described below in conjunction with FIGS. 8-9.

As used herein, the terms "document" or "UGC document" refer to virtually any form of content that may be provided over a network between network devices and is directed towards being displayed to a user. Thus, web pages, word processing documents, spreadsheets, digital images, and the like, are included in the term "document." Documents are not limited to these examples, and other types of content formats are also included in the term "document."

As used herein, the term "classifier" refers to any of a variety of document organization mechanisms useable to categorize content (documents) based on some defined criteria. As used herein, the classifiers are directed towards categorizing a given content or document based on a determination of whether the document has subject matter specificity useable in a UGC subject matter search result. Such classifiers may employ a variety of mechanisms to make such a determination including, but not limited to being initially trained to distinguish document types. Such training may be performed to recognize various features, and/or other characteristics of a document. The classifiers may then be used to categorize subsequent documents based on the training.

The classifiers may employ a variety of approaches to categorize documents, including, but not limited to artificial intelligence approaches, various machine learning algorithms, or the like. Non-exhaustive examples include naïve Bayes, Support-Vector machines, logistic regression, perceptrons, Markovian discrimination approaches, neural networks, decision trees, or the like. Further, each of these algorithms may employ different variations, such as regularization, feature weighting, or the like. Another embodiment of a classifier employs decision trees. Such decision trees provide a predictive decision model that may be used to map observations about an object such as a UGC document to conclusions about a value associated with that document. One such embodiment of a decision tree useable as a classifier is described in more detail below in conjunction with FIG. 7. Decision trees may also be known as classification models, or regression trees.

The following briefly describes the embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated the present invention is directed towards filtering from a user generated content (UGC) search result those documents determined to have insufficient subject matter specificity as defined by a training event of a classifier. The training event comprises selecting a set of UGC documents that is definable as having sufficient subject matter specificity (a good set), and another set of UGC that is definable as having insufficient subject matter specificity (a bad set). Such sets may be selected using any of a variety of approaches, including, but not limited to a peer review of various documents, based on pre-defined criteria, randomly selected from one or more known social networking sites, or the like.

Subject matter specificity may be defined as those documents having various document feature criteria with quality thresholds above a defined value. Such document features may include, but are not limited to a word count, a number of phonetics within a document, a frequency of special characters such as Latin non-words, a number of non-word symbols, a frequency of visual line breaks, a frequency of images, a frequency of fInction words, or the like. Thus, training sets may be selected based at least in part on their document features. A UGC classifier is then trained based on the good and bad sets. The training is directed toward enabling the UGC classifier to establish internal weighting factors, identifying various parameters, thresholds, and the like, based on a review of the known sets. Re-training of the UGC classifier may be performed at virtually any time based on a variety of criteria, including, but not limited to user feedback about the UGC classifier's results, a test of a quality result of the UGC classifier on another set of test documents, or the like.

In any event, after the UGC classifier is determined to be trained, UGC search results may be submitted to the UGC classifier. The trained UGC classifier may then examine the documents, and based on the documents having an overall quality feature score above a defined threshold based on a combination of one or more of the document feature scores, categorize the documents as having sufficient subject matter specificity (or not). In one embodiment, the feature scores may be combined to generate a single document quality feature score that is useable for comparison to a quality threshold to determine a sufficiency of subject matter specificity. In any event, those documents having insufficient subject matter specificity based on their determined thresholds may be filtered out of the submitted UGC search results. The documents remaining within the UGC search results may then be provided to a searcher for display at their client device.

It should be noted that while various embodiments of the invention are disclosed for use with UGC documents, the invention is not so limited. Thus, other types of documents may also be submitted to train a classifier. For example, advertisements may be submitted to train a classifier on various quality features of advertisements. For example, advertisements that provide educational information might be considered to have a higher quality feature set than those advertisements that merely display the product, a price, or the like. Other types of documents may also be filtered using a trained classifier to distinguish a quality of the documents based on perhaps a different set of features. Thus, the invention is not to be construed as being limited to merely UGC document filtering, and other types of content may also be employed, without departing from the scope of the invention.

Illustrative Operating Environment

FIG. 1 shows components of one embodiment of an environment in which the invention may be practiced. Not all the components may be required to practice the invention, and variations in the arrangement and type of the components may be made without departing from the spirit or scope of the invention. As shown, system 100 of FIG. 1 includes local area networks ("LANs")/wide area networks ("WANs")—(network) 105, wireless network 110, UGC Search Services (USS) 106, client devices 101-104, and content servers 107-108.

One embodiment of client devices 102-103 is described in more detail below in conjunction with FIG. 2. Generally, however, client devices 102-104 may include virtually any portable computing device capable of receiving and sending a message over a network, such as network 105, wireless network 110, or the like. Client devices 102-104 may also be described generally as client devices that are configured to be portable. Thus, client devices 102-104 may include virtually any portable computing device capable of connecting to another computing device and receiving information. Such devices include portable devices such as, cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, and the like. As such, client devices 102-104 typically range widely in terms of capabilities and features For example, a cell phone may have a numeric keypad and a few lines of monochrome LCD display on which only text may be displayed. In another example, a web-enabled mobile device may have a touch sensitive screen, a stylus, and several lines of color LCD display in which both text and graphics may be displayed.

Client device 101 may include virtually any computing device capable of communicating over a network to send and receive information, including social networking information, performing search queries, or the like. Client device 101 may also include client applications such as those described above, as well as being configured to provide location information.

The set of such devices may include devices that typically connect using a wired or wireless communications medium such as personal computers, multiprocessor systems, microprocessor-based or programmable consumer electronics, network PCs, or the like. Moreover, at least some of client devices 102-104 may operate over wired and/or wireless network.

A web-enabled client device may include a browser application that is configured to receive and to send web pages, web-based messages, and the like. The browser application may be configured to receive and display graphics, text, multimedia, and the like, employing virtually any web based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message. In one embodiment, a user of the mobile device may employ the browser application to perform a search over a network. However, another application may also be used to perform a search over the network.

Client devices 101-104 also may include at least one other client application that is configured to receive content from another computing device. The client application may include a capability to provide and receive textual content, graphical content, audio content, and the like. The client application may further provide information that identifies itself, including a type, capability, name, and the like. In one embodiment, client devices 101-104 may uniquely identify themselves through any of a variety of mechanisms, including a phone number, Mobile Identification Number (MIN), an electronic serial number (ESN), or other mobile device identifier. The information may also indicate a content format that the mobile device is enabled to employ. Such information may be provided in a network packet, or the like, sent to USS 106, content servers 107-108, or other computing devices.

Client devices 101-104 may further be configured to include a client application that enables the end-user to log into an end-user account that may be managed by another computing device, such as content servers 107-108, USS 106, or the like. Such end-user account, for example, may be configured to enable the end-user to receive emails, send/receive IM messages, SMS messages, access and/or modify selected web pages, participate in a social networking activity, perform search queries, or the like. However, participation in various social networking activities, performing search queries, or the like, may also be performed without logging into the end-user account. Such search queries might be performed using, for example, USS 106, where the searches might be performed on content provided through content servers 107-108.

Wireless network 110 is configured to couple client devices 102-104 and its components with network 105. Wireless network 1 10 may include any of a variety of wireless sub-networks that may farther overlay stand-alone ad-hoc networks, and the like, to provide an infrastructure-oriented connection for client devices 102-104. Such sub-networks may include mesh networks, Wireless LAN (WLAN) networks, cellular networks, and the like.

Wireless network 110 may farther include an autonomous system of terminals, gateways, routers, and the like connected by wireless radio links, and the like. These connectors may be configured to move freely and randomly and organize themselves arbitrarily, such that the topology of wireless network 110 may change rapidly.

Wireless network 110 may further employ a plurality of access technologies including 2nd (2G), 3rd (3G) generation radio access for cellular systems, WLAN, Wireless Router (WR) mesh, and the like. Access technologies such as 2G, 3G, and future access networks may enable wide area coverage for mobile devices, such as client devices 102-104 with various degrees of mobility. For example, wireless network 110 may enable a radio connection through a radio network access such as Global System for Mobil communication (GSM), General Packet Radio Services (GPRS), Enhanced Data GSM Environment (EDGE), Wideband Code Division Multiple Access (WCDMA), and the like. In essence, wireless network 110 may include virtually any wireless communication mechanism by which information may travel between client devices 102-104 and another computing device, network, and the like.

Network 105 is configured to couple network devices with other computing devices, including, USS 106, content servers 107-108, client device 101, and through wireless network 110 to client devices 102-104. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 105 includes any communication method by which information may travel between USS 106, content servers 107-108, client device 101, and other computing devices.

Additionally, communication media typically embodies computer-readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media.

One embodiment of USS 106 is described in more detail below in conjunction with FIG. 3. Briefly, however, USS 106 may include any computing device capable of connecting to network 105 to receive and perform UGC subject matter specificity searches. It is noted that while USS 106 may be configured to filter UGC documents for those having sufficient subject matter specificity as defined by selected features within a document having values exceeding a threshold, the invention is not so limited. For example, in at least one other embodiment, USS 106 may also be configured and trained to categorize documents from any of a variety of other sources, in addition to and/or in place of UGC documents. For example, in one embodiment, USS 106 might be configured to categorize merchant generated sites based on having sufficient subject matter specificity as defined by another set of defined elements.

USS 106 may include a classifier (filter) that is trainable to categorize documents according to a defined set of criteria. For example, in one embodiment, the classifier filter may be trained to categorize UGC documents (web pages, content, and the like) that is determined to have sufficient subject matter specificity for a UGC based search. Defining a document to have sufficient subject matter specificity is performed, in one embodiment, by selecting a set of documents known to have sufficient subject matter specificity according to a defined set of criteria. The defined set of criteria may include a variety of criteria. For example, in one embodiment the classifier might be trained to recognize documents that might have few words, a large number of pictures, and/or other information that might not be what is definable as having a general interest to potential social networking searchers. Thus, for example, a UGC site that includes a person's baby pictures, drinking pictures, family photographs, personal diaries, or the like, might be viewed as having insufficient subject matter specificity. A UGC site that might include a person's opinion on various political, educational, products, services, and/or similar topics might be viewed as having sufficient subject matter specificity. Non-limiting, non-exhaustive examples of UGC documents having insufficient subject matter specificity and sufficient subject matter specificity are illustrated in FIGS. 8-9, respectively.

In any event, a set of known documents having sufficient subject matter specificity (good set), and another set of known documents having insufficient subject matter specificity (bad set) may be provided to the UGC classifier generator to train the classifier. Training of UGC may involve a variety of actions, including modifying internal parameters to the UGC classifier used to weight selected document features. Such document features may include, but are not limited to a number of words in a given document, a number of phonetic notations, a frequency of special non-words, a number of special symbols, a frequency of visual line breaks, a frequency or number of images in the document, a number of function words, a text in date type, or the like. By training the UGC classifier, the UGC classifier generator may modify its internal weighting scheme, or other algorithms, and/or criteria used to classify documents.

USS 106 may then employ the trained UGC classifier to categorize documents obtained during a user's search. That is, USS 106 may receive from a client device 101-104 are request to perform a search for content. In one embodiment, the search may be performed over various content server sites, such as content servers 107-108. However, the invention is not so limited, and searches may also be performed over a database, data store, or the like. In any event, results from the search may then be submitted to the trained UGC classifier, where documents in the search result are categorized. In one embodiment, the UGC classifier may be configured to determine a single value for each document useable to determine if the document has sufficient subject matter specificity. In another embodiment, a plurality of values may be tested against one or more threshold values to determine if the document has sufficient subject matter specificity. Those document determined to have insufficient subject matter specificity based on the threshold(s), may be filtered from the search results. Remaining documents may then be provided to the searcher client device for display at the client device.

Devices that may operate as USS 106 include various network devices, including, but not limited to personal computers desktop computers, multiprocessor systems, microprocessor-based or programmable consumer electronics, network PCs, servers, network appliances, and the like.

Although FIG. 1 illustrates USS 106 as a single computing device, the invention is not so limited For example, one or more functions of USS 106 may be distributed across one or more distinct computing devices. For example, managing search queries may be performed by one computing device, while categorizing and filtering the search results may be performed by another computing device, without departing from the scope or spirit of the present invention.

Content servers 107-108 represents any of a variety of social networking services that may accessible by client devices 101-104. Such services include, but are not limited to blog sites that may include diaries, opinions, audio content, video content, or the like. Moreover, the content and/or services provided by content servers 107-108 may be employed to provide results to a search query.

Devices that may operate as content servers 107-18 include personal computers desktop computers, multiprocessor systems, microprocessor-based or programmable consumer electronics, network PCs, servers, and the like.

Illustrative Client Device

Figure 2:
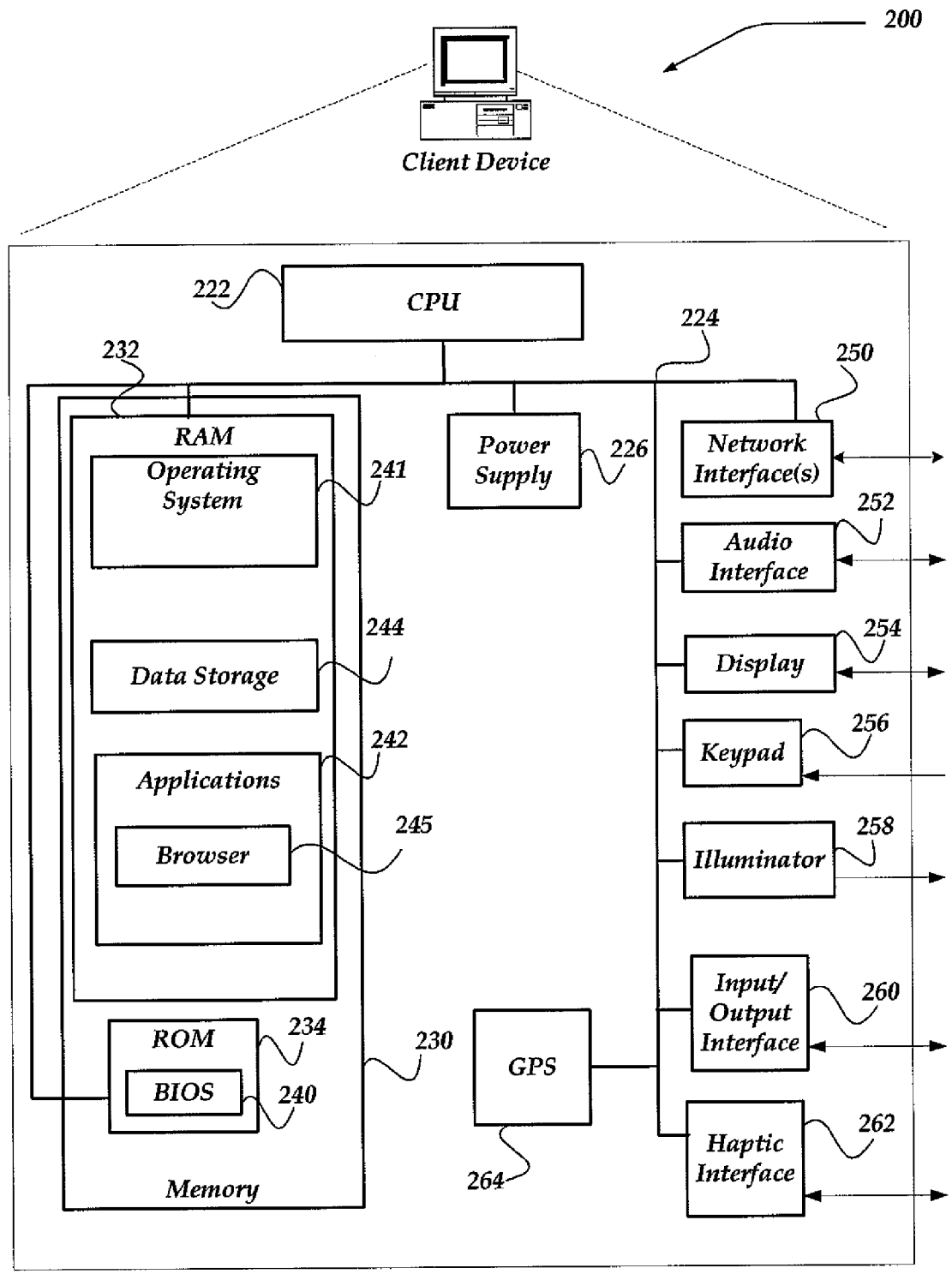
FIG. 2 shows one embodiment of a client device that may be included in a system implementing the invention.

FIG. 2 shows one embodiment of client device 200 that may be included in a system implementing the invention. Client device 200 may include many more or less components than those shown in FIG. 2. However, the components shown are sufficient to disclose an illustrative embodiment for practicing the present invention. Client device 200 may represent, for example, one embodiment of at least one of client devices 101-104 of FIG. 1.

As shown in the figure, client device 200 includes a processing unit (CPU) 222 in communication with a mass memory 230 via a bus 224. Client device 200 also includes a power supply 226, one or more network interfaces 250, an audio interface 252, a display 254, a keypad 256, an illuminator 258, an input/output interface 260, a haptic interface 262, and an optional global positioning systems (GPS) receiver 264. Power supply 226 provides power to client device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station (not shown), or directly with another computing device. Network interface 250 includes circuitry for coupling client device 200 to one or more networks, and is constructed for use with one or more communication protocols and technologies including, but not limited to, global system for mobile communication (GSM), code division multiple access (CDMA), time division multiple access (TDMA), user datagram protocol QTDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, or any of a variety of other wireless communication protocols. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Client device 200 also comprises input/output interface 260 for communicating with external devices, such as a headset, or other input or output devices not shown in FIG. 2. Input/output interface 260 can utilize one or more communication technologies, such as USB, infrared, Bluetooth™, or the like. Haptic interface 262 is arranged to provide tactile feedback to a user of the client device. For example, the haptic interface may be employed to vibrate client device 200 in a particular way when another user of a computing device is calling.

Optional GPS transceiver 264 can determine the physical coordinates of client device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of client device 200 on the surface of the Earth. It is understood that under different conditions, GPS transceiver 264 can determine a physical location within millimeters for client device 200; and in other cases, the determined physical location may be less precise, such as within a meter or significantly greater distances. In one embodiment, however, mobile device may through other components, provide other information that may be employed to determine a physical location of the device, including for example, a MAC address, IP address, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of client device 200. The mass memory also stores an operating system 241 for controlling the operation of client device 200. It will be appreciated that this component may include a general purpose operating system such as a version of UYNIX, or LINUX™, or a specialized client communication operating system such as Windows Mobile™, or the Symbian® operating system. The operating system may include, or interface with a Java virtual machine module that enables control of hardware components and/or operating system operations via Java application programs.

Memory 230 further includes one or more data storage 244, which can be utilized by client device 200 to store, among other things, applications 242 and/or other data. For example, data storage 244 may also be employed to store information that describes various capabilities of client device 200. The information may then be provided to another device based on any of a variety of events, including being sent as part of a header during a communication, sent upon request, or the like. Moreover, data storage 244 may also be employed to store social networking information including address books, buddy lists, aliases, or the like. At least a portion of the information may also be stored on a disk drive or other storage medium (not shown) within client device 200.

Applications 242 may include computer executable instructions which, when executed by client device 200, transmit, receive, and/or otherwise process messages (e.g., SMS, MMS, IM, email, and/or other messages), audio, video, and enable telecommunication with another user of another client device. Other examples of application programs include calendars, search programs, email clients, IM applications, SMS applications, VOIP applications, contact managers, task managers, transcoders, database programs, word processing programs, security applications, spreadsheet programs, games, search programs, and so forth. One application shown in the figure is browser 245.

Browser 245 may include virtually any application configured to receive and display graphics, text, multimedia, and the like, employing virtually any web based language. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message. However, any of a variety of other web based languages may be employed.

In one embodiment, browser 245 may be configured to enable access to a search application, such as might be available through USS 106 of FIG. 1. In one embodiment, a user of client device 200 may input to the search application a variety of search terms for use in obtaining a search results. In one embodiment, the search query might be directed to UGC content based on various input by a user of client device 200. In another embodiment, the user might specify over what content to perform the search via various selection parameters, or the like.

Illustrative Network Device

Figure 3:
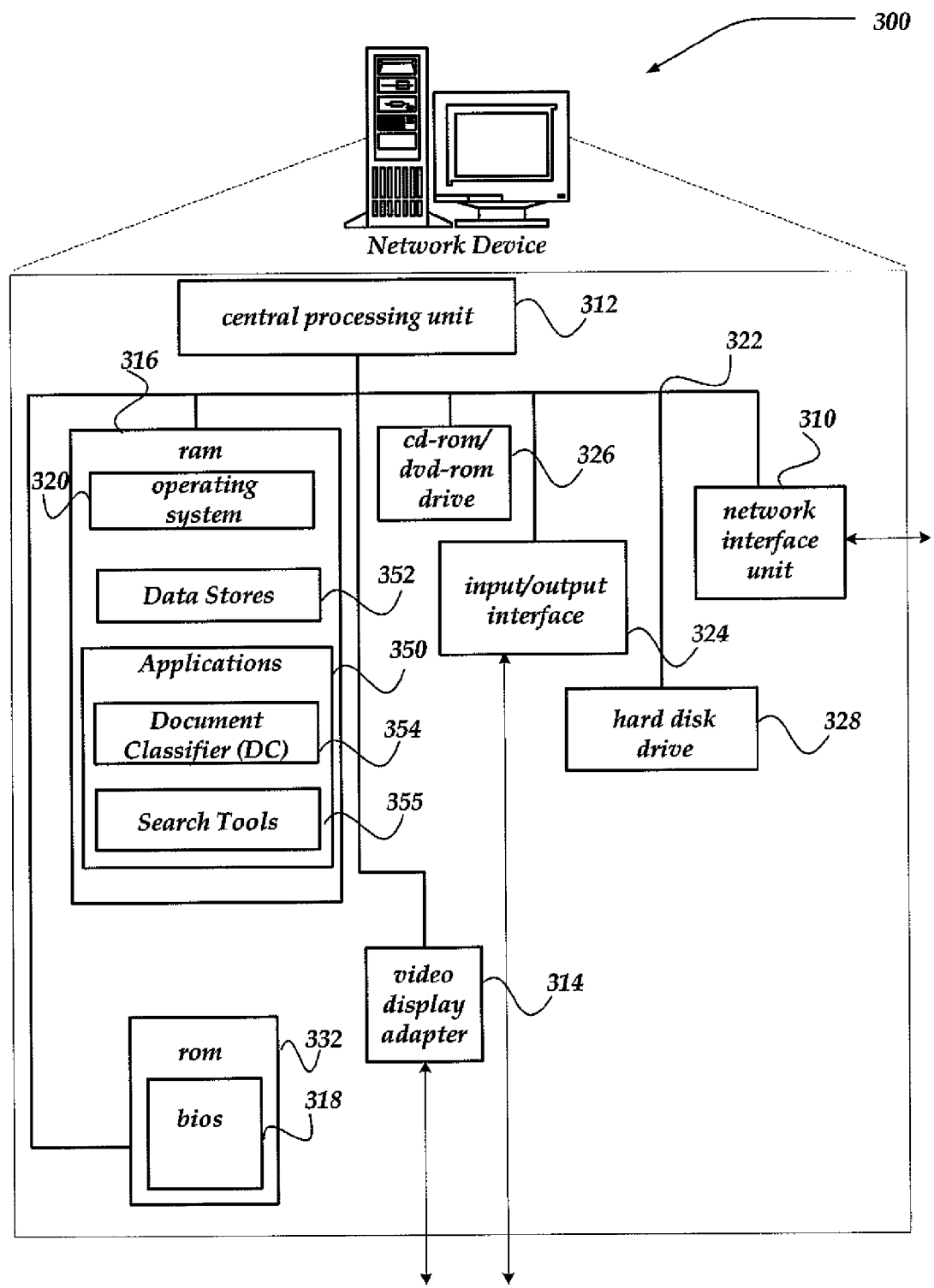
FIG. 3 shows one embodiment of a network device that may be included in a system implementing the invention.

FIG. 3 shows one embodiment of a network device 300, according to one embodiment of the invention. Network device 300 may include many more or less components than those shown. The components shown, however, are sufficient to disclose an illustrative embodiment for practicing the invention. Network device 300 may represent, for example, US S 106 of FIG. 1.

Network device 300 includes processing unit 312, video display adapter 314, and a mass memory, all in communication with each other via bus 322. The mass memory generally includes RAM 316, ROM 332, and one or more permanent mass storage devices, such as hard disk drive 328, tape drive, optical drive, and/or floppy disk drive. The mass memory stores operating system 320 for controlling the operation of network device 300. Any general-purpose operating system may be employed. Basic input/output system ("BIOS") 318 is also provided for controlling the low-level operation of network device 300. As illustrated in FIG. 3, network device 300 also can communicate with the Internet, or some other communications network, via network interface unit 310, which is constructed for use with various communication protocols including the TCP/IP protocol. Network interface unit 310 is sometimes known as a transceiver, transceiving device, or network interface card (NIC).

The mass memory as described above illustrates another type of computer-readable media, namely computer storage media. Computer storage media may include volatile, nonvolatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

As shown, data stores 352 may include a database, text, spreadsheet, folder, file, or the like, that may be configured to maintain and store subject matter specificity classifier data, threshold values, training documents, document feature sets, search parameter selections for a given searcher, one or more lists of sites over which a search is to be performed, search results, or the like. In one embodiment, at least some of data store 352 might also be stored on another component of network device 300, including, but not limited to cd-rom/dvd-rom 326, hard disk drive 328, or the like.

The mass memory also stores program code and data. One or more applications 350 are loaded into mass memory and run on operating system 320. Examples of application programs may include transcoders, schedulers, calendars, database programs, word processing programs, HTTP programs, customizable user interface programs, IPSee applications, encryption programs, security programs, SMS message servers, IM message servers, email servers, account managers, and so forth. Document classifier (DC) 354, and search tools 355 may also be included as application programs within applications 350.

Search tools 355 includes virtually any applications, scripts, robots, spiders, and/or other components useable to perform a search for documents and/or other content based on a search query. Thus, search tools 355 may receive a request to perform a search from one of client devices 101-104 of FIG. 1. Search tools 355 may further receive either in conjunction with the request for the search, and/or prior to the search request, various information indicating over what content to perform the search. For example, search tools 355 might be configured to perform searches over data within a data store, such as data store 352, over content available at a content server, such as content servers 107-108 of FIG. 1, or the like. In one embodiment, search tools 355 might be pre-configured to perform searches over pre-defined sites known to provide UGC. However, the invention is not so limited, and searches may be performed over other sites as well. Search tools 355 may then, in one embodiment, provide results of the search to DC 354.

DC 354 is configured to receive search results and to categorize the results of the search to identify those results having sufficient subject matter specificity and those documents having insufficient subject matter specificity based on a training of DC 354. DC 354 may then filter out those documents from the search having insufficient subject matter specificity and provide the remaining documents to search tools 354 such that the remaining documents may be provided to the searching client device for display. In one embodiment, DC 354 in conjunction with search tools 352 may employ a process such as described below in conjunction with FIG. 4.

Moreover, although illustrated within network device 300, it should be understood, the DC 354, search tools 352, or the like, may reside within different network devices, network appliances, or the like. Moreover, in one embodiment, DC 354 might be configured to operate within one or more client devices. Thus, in one embodiment, a user of client devices 101-104 of FIG. 1 might download DC 354 for use on their client device. Based on a variety of events, criteria, or the like, an update to DC 354 might be received at the client device. Thus, the invention is not to be construed as limiting an implementation of the classifier to a server, and other implementations are also envisaged.

Generalized Operation

Figure 4:
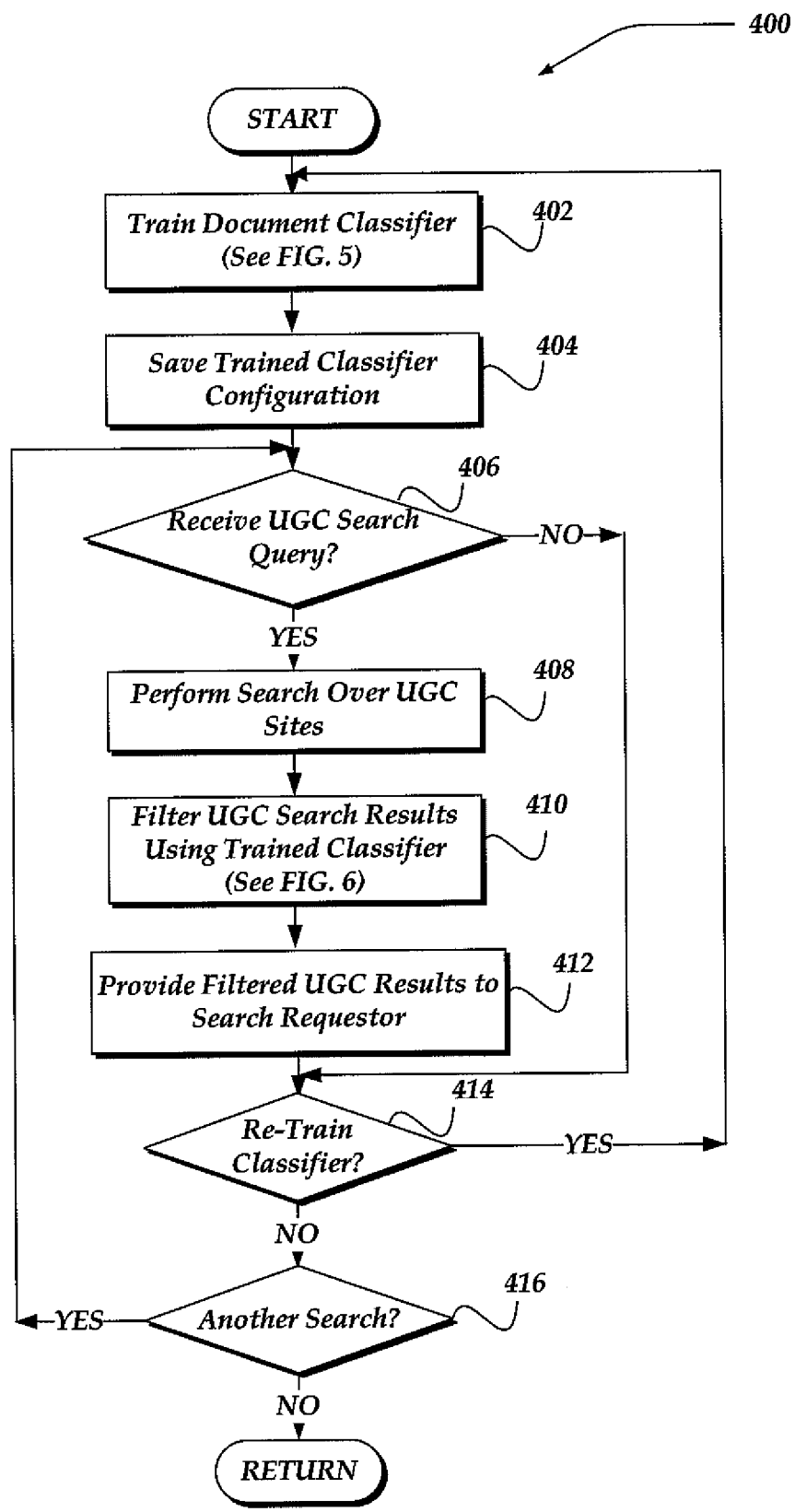
FIG. 4 illustrates a logical flow diagram generally showing one embodiment of an overview process for refining a search query result by using a subject matter classifier to filter search results.

The operation of certain aspects of the invention will now be described with respect to FIGS. 4-6. FIG. 4 illustrates a logical flow diagram generally showing one embodiment of an overview of a process for refining a search query result by using a subject matter classifier to remove selected results. Moreover, process 400 of FIG. 4 may be implemented with USS 106 of FIG. 1.

Process 400 begins, after a start block, at block 402, which is described in more detail below in conjunction with FIG. 5. Briefly, however, at block 402, a document classifier is trained based on receiving a plurality of documents. In one embodiment, the plurality of documents is randomly selected from various websites. Typically, a large number of documents, between 1000-2000 documents may be used to train the classifier; however, the invention is not so limited, and another number of documents may also be used. Moreover, the selection of documents may be made randomly; however, other selection schemes may also be employed, including but not limited to selecting from particular types of known quality documents, or the like. In any event, a result of block 402 is that a classifier is trained to distinguish between documents have a defined feature quality value above determined threshold.

Process then flows to block 404, where classification data useable by the trained classifier, as well as the trained classifier may be saved for subsequent use. Process 404 then flows to decision block 406, where a determination is made whether a search query request is received. In one embodiment, search requests may be received for searching over UGC document sites. In any event, if a UGC document search query is received, the process flows to block 408; otherwise, the process branches to decision block 414.

At block 408, the search query is submitted to any of a variety of search tools that may be configured to perform a search over a plurality of UGC related documents, sites, network devices having UGC documents, or the like. While there are a variety of such search tools, non-limiting example include the search tools provided for web searches by Yahoo!, Inc. of Sunnyvale, Calif. At block 408, a set of UGC documents determined to satisfy the search query may be returned.

Processing continues to block 410, which is described in more detail below in conjunction with FIG. 6. Briefly, however, at block 410, the UGC search results are submitted to the trained UGC classifier, where documents identified with the search results may be removed from the results based on having a feature quality value below a determined threshold. The remaining filtered UGC resulting documents may then be provided to the search requester at block 412.

Processing continues next to decision block 414, where a determination is made whether to re-train the classifier. Such re-training may be based on any of a variety of criteria, including, but not limited to feedback from users of the classifier, a result of a quality check of the classifier, a detected change in types of UGC documents being included at selected network sites, or the like. In one embodiment, a re-training might be performed periodically to ensure that a high level of confidence in the filtering results of the classifier may be maintained. In another embodiment, re-training may be performed based on historical click through rates observed for filtered search results. In any event, if the classifier is to be re-trained, processing loops back to block 402; otherwise, processing flows to decision block 416.

At decision block 416, a determination is made whether to perform additional classifications for UGC document search queries. If so, processing loops back to decision block 406; otherwise, processing may return to a calling process to perform other actions.

Figure 5:
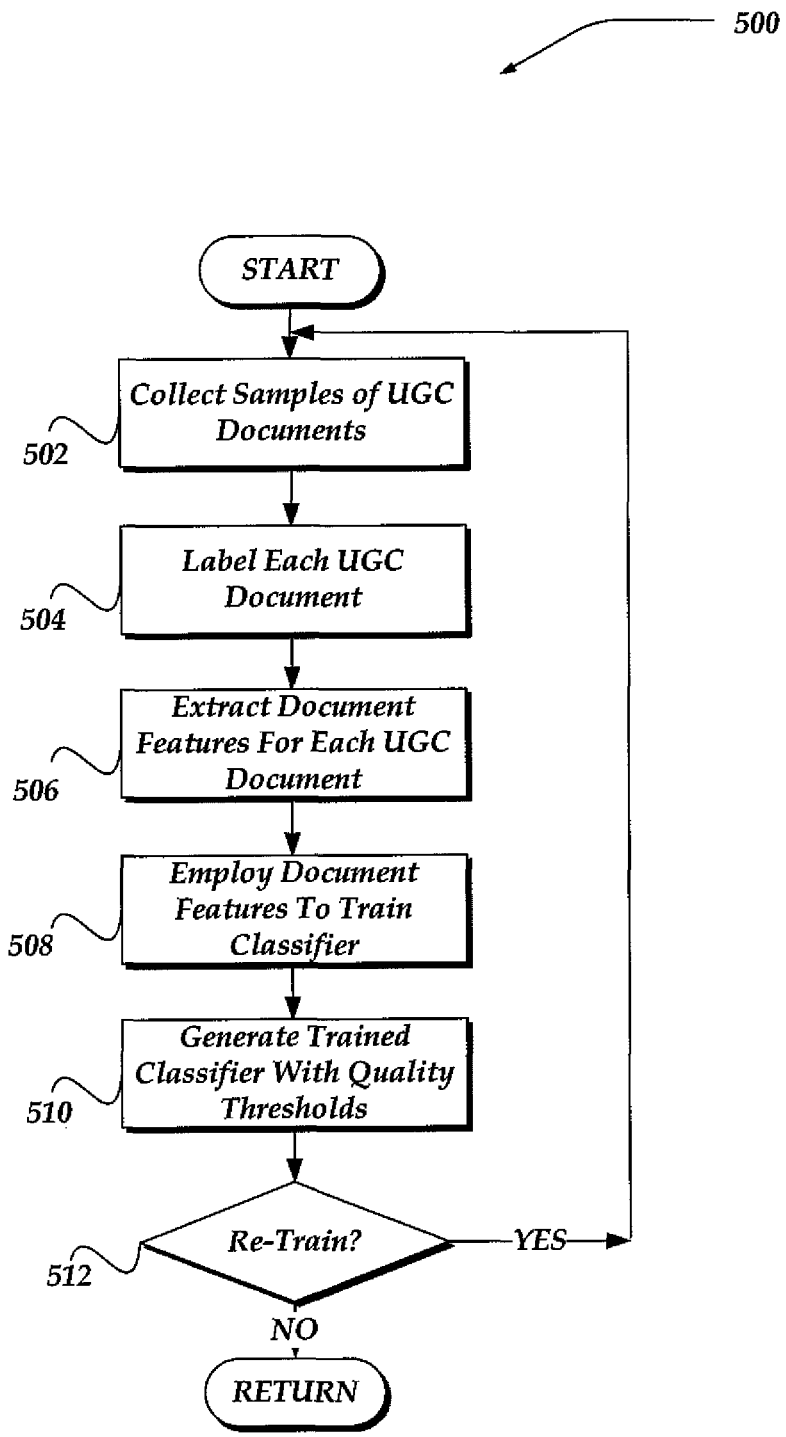
FIG. 5 illustrates a logical flow diagram generally showing one embodiment of a process for training a subject matter classifier to filter search results.

FIG. 5 illustrates a logical flow diagram generally showing one embodiment of a process for training a subject matter classifier to remove selected results. Process 500 of FIG. 5 may represent one embodiment of a training process as described above in conjunction with block 402 of FIG. 4.

Process 500 of FIG. 5 begins, after a start block, at block 502, where a collection of sample documents are obtained. As mentioned above, while virtually any number of documents may be used, typically, a sample size may be chosen that enables a desired level of confidence in the classifier's decisions. In one embodiment, the number of documents may be selected a random from known sources, such as known blog sites, or the like. In another embodiment, the documents may be chosen to ensure an approximate even distribution between those documents having what may be considered as sufficient subject matter specificity, and those documents having what may be considered as having insufficient subject matter specificity.

Documents that may be considered to have insufficient subject matter specificity might be defined as those documents typically related to personal diaries, photo commentary sites, gossip sites, chat sites, and the like. Referring briefly to FIG. 8, shown is a non-limiting, non-exhaustive example of a UGC document 800 having what is definable as insufficient subject matter specificity. As may be seen, this example document might be defined as a personal diary, having little written content that might be considered at least by some as either educational, or otherwise interesting in the context of a search query. FIG. 9 illustrates, on the other hand, a non-limiting, non-exhaustive example of a UGC document 900 having what may be considered as sufficient subject matter specificity for use in a UGC subject matter search. As may be seen, document 900 includes written material that may be considered to be educational. Thus, a quick comparison between the two documents 800 and 900, selected features may be extracted that may be useable to distinction these types of content. It is noted, however, that in at least some situations, a searcher might actually be searching for subject matter within personal diaries, or the like. Thus, it should be noted that the invention is not limited to a particular definition of sufficient subject matter specificity. Such distinction may be based, therefore, at least in part, on the document categorizations used to train the classifier.

In any event, once a plurality of documents are collected, processing flows to block 504, where the documents may be examined and labeled as good documents—having sufficient subject matter specificity, or bad documents—having insufficient subject matter specificity. In one embodiment, such labeling may be performed based on a visual observation of the documents by experienced administrators, or other personnel. In another embodiment, the plurality of documents may be submitted to a previously trained classifier that examines the documents for predefined quality criteria. In one embodiment, the documents might be examined and/or distinguished based on an amount of text to an amount of images to a document. However, the invention is not limited to these labeling criteria, and others may also be used.

Process 500 then flows to block 506, where document features are extracted (or otherwise determined) for each of the plurality of training documents. Such document features may be selected as those features that tend to be useable to distinguish subject matter specificity levels for documents. For example, such document features may include, but are not limited to a document length, punctuation frequencies, emotional words, or the like. However, the invention is not so limited. Thus, in another embodiment, the following set of document features might be employed:

Word count (WC) in a document title and/or body,

A number of phonetics (PH), and/or phonetic notations used in a document title and/or body, A frequency of Latin non-words (NW), such as non-alphabetic characters (such as: #, @, <, or the like), punctuations (such as:. !, :, ", or the like.), or the like, in a document title and/or body, where the frequency is determined over the word count for the document, A number of special characters (SYM), such as smiles, or the like, in the document body and/or title, A frequency of visual line breaks (LB) in a document body, as computed over a word count for the document, wherein such line breaks might indicate a number of paragraphs in the document, A frequency of images (IMG) in a document body as computed over a word count for the document, A frequency of function words (FW) or grammatical words, e.g. words having little lexical meaning, such as articles, pronouns, conjunctions, auxiliary verb, and the like, in a document body as computed over a word count for the document, and/or A text in date type in a document title (DATE).

Other document features may also be extracted and/or otherwise determined for each document in the plurality of training documents. Processing then proceeds to block 508, where the document features are used to train the classifier. While virtually any classifier mechanism may be used, one embodiment of a classifier includes decision trees. One example of such a decision tree is described in more detail below in conjunction with FIG. 7. Briefly, however, the decision tree may be generated based on the received training documents. As part of the training, the various document features are used, along with the document labels (good or bad) to generate criteria, feature scores, and a flow through the decision tree. In one embodiment, feature scores for each document feature may be combined to generate an overall quality feature score. Moreover, processing flows to block 510, where a quality threshold may be determined that indicates whether a document is a good or a bad document with respect to subject matter specificity. In one embodiment, the scores may be combined using a weighted summation to generate the overall quality feature score.

Process 500 then flows to a decision block 512, where a determination is made whether to re-train the classifier. Such determination may be based on an evaluation of the resulting classifier indicating that perhaps the classifier may require additional training documents, such as might arise where a distinction between good and bad documents may be considered to be at an unacceptable confidence level. However, other reasons for re-training may also be employed. In any event, if the classifier is to be re-trained, processing loops back to block 502; otherwise, processing returns to a calling process to perform other actions.

Figure 6:
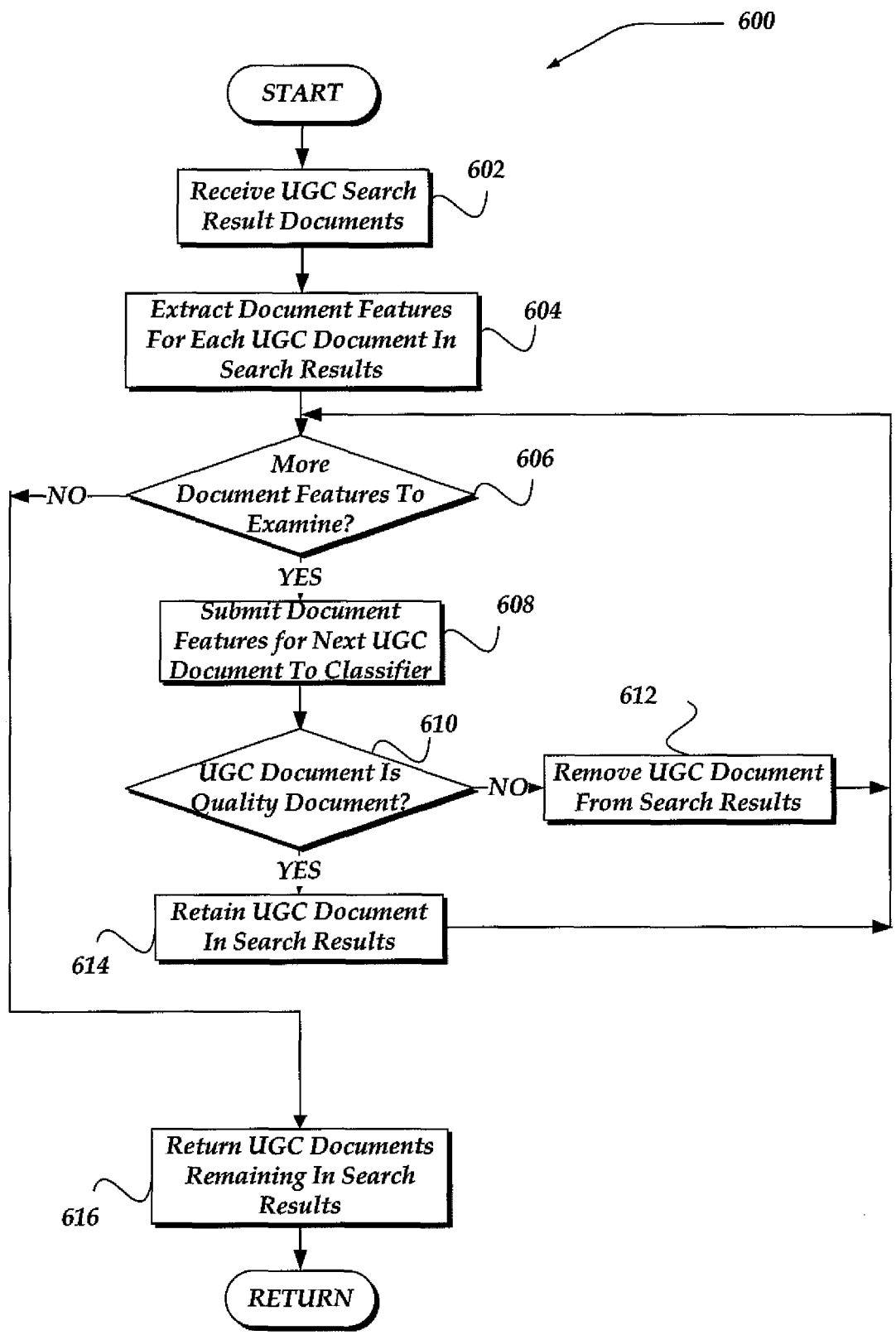
FIG. 6 illustrates a logical flow diagram generally showing one embodiment of a process for employing the trained subject matter classifier to filter search results.

FIG. 6 illustrates a logical flow diagram generally showing one embodiment of a process for employing the trained subject matter classifier to remove selected results from a search query result. Process 600 of FIG. 6 may represent one embodiment of a process usable at block 410 of FIG. 4.

Process 600 begins, after a start block, at block 602, where search result documents are received. As noted above, such documents may be UGC documents that are identified based on a search query. Processing continues to block 604, where document features are extracted or otherwise identified for each of the received documents.

Processing flows next to decision block 606 where a determination is made whether there are more documents to be examined by the classifier. In a first pass through process 600, it is anticipated that at least one document is received for classification. Thus, in the first pass, the response would be yes, and processing flows to block 608; otherwise, if there are no more documents to be examined, processing loops to block 616.

At block 608, document features for each document are respectively submitted to the trained document classifier to determine whether the document has sufficient subject matter specificity or not. One embodiment, of such an examination is described in more detail below in conjunction with FIG. 7. In any event, as an output of block 608, each document that is examined may have an evaluation performed based on one or more features to generate an overall quality feature score, based on a combination of individual feature scores.

Process 600 flows to decision block 610, where a determination is made whether the overall quality feature score exceeds a quality threshold level. If the quality feature score exceeds the threshold level, then the document may be defined as having sufficient subject matter specificity, and processing flows to block 614; otherwise, processing flows to block 612.

At block 612, the document having insufficient subject matter specificity as determined by the classifier at block 608 is removed from the received search result documents. Processing then loops back to decision block 606. At block 614, the document having sufficient subject matter specificity as determined by the classifier at block 608 is retained in the received search result documents. Processing then loops back to decision block 606.

At block 616, the documents remaining in the received search results are then returned, and processing 600 returns to a calling process to perform other actions.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

Non-Limiting Illustrative Embodiment of A Classifier

Figure 7:
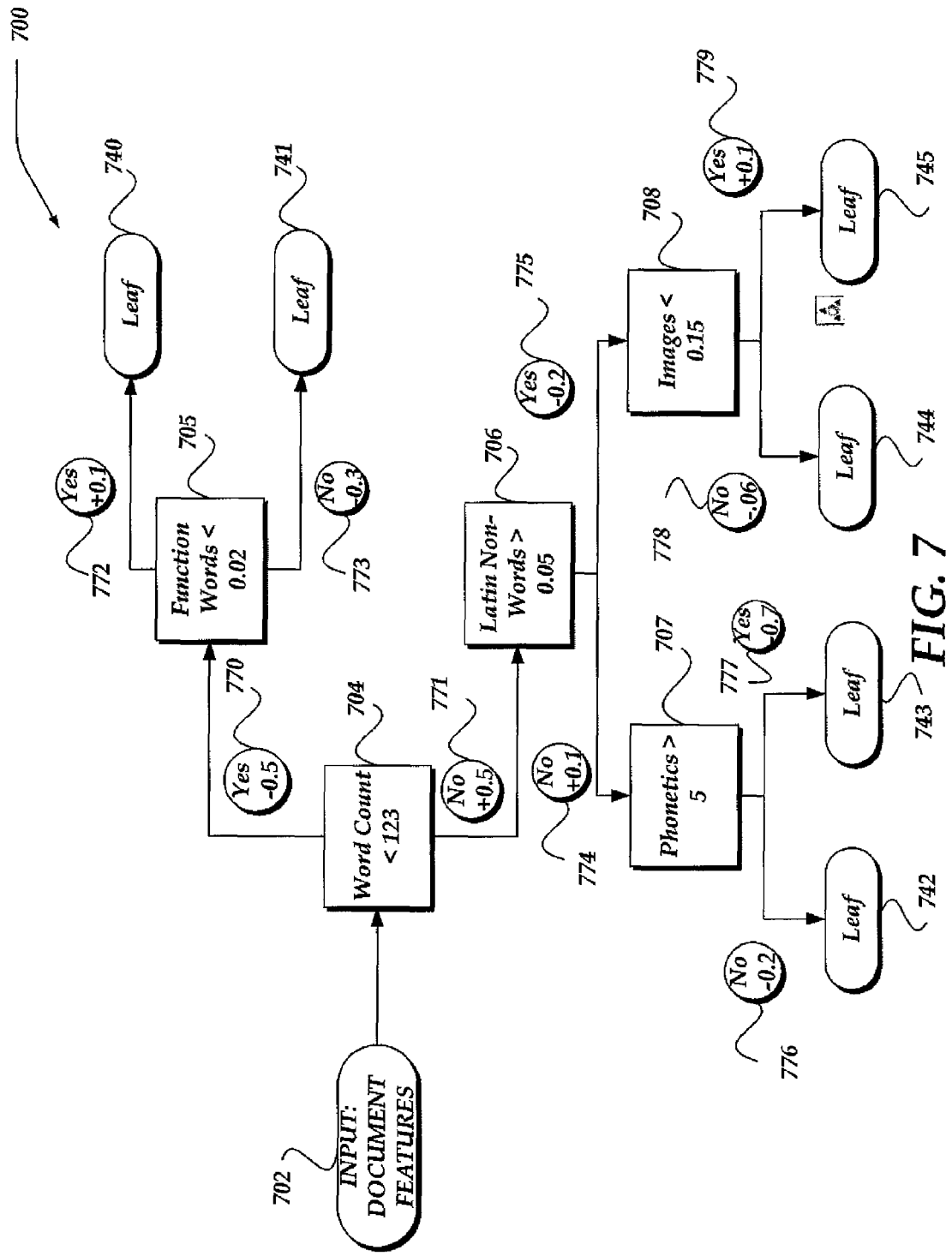
FIG. 7 illustrates a non-limiting, non-exhaustive embodiment of a trained UGC classifier implemented using a decision tree for determining a UGC document quality.

FIG. 7 illustrates a non-limiting, non-exhaustive embodiment of a trained UGC classifier implemented using a decision tree for determining a UGC document quality. Decision tree 700 of FIG. 7 may include more or less components than illustrated. However, the components shown are sufficient to disclose an illustrative embodiment for practicing the present invention. Decision tree 700 may represent one embodiment of a trained classifier useable for categorizing a document as having sufficient subject matter specificity, or insufficient subject matter specificity, based in part on a set of document features.

As shown, decision tree 700 includes an input node 702, decision nodes 704-708, decision or outcome scores 770-779, and leaves 740-745. Decision tree 700 may be generated based on training feature documents and quality information about those documents as described above in conjunction with FIG. 5. That is, during a training activity, decision tree 700 is generated, including, but not limited to the set of decisions embodied by decision nodes 704-708, and outcome scores 770-779.

As noted above, a document's features may be extracted from the training documents and used to generate decision tree 700. For example, the following might represent possible document feature sets, along with a quality rating for the training documents, using the acronyms mentioned above:

Document 1:
    <wc:2125><ph:0><nw:0.005><sym:0><lb:0.003><img: 0.011><fw:0.046><date:0><quality:good>

Document 2:
    <wc:455><ph:2><nw:0.103><sym:0><b:0.004><img: 0.004><fv:0.032><date:0><quality:bad>

As may be seen from decision tree 700 at least some of the input document features might, in on embodiment, result in virtually no statistical difference. Thus, in one embodiment, at least some of the document features might not result in generating decision nodes within decision tree 700. Thus, while word count, function word, Latin non-words, phonetics, and images resulted in decision nodes 704-708, no decision node is illustrated for date, line breaks, or symbols. Given another set of training documents, decision tree 700 may be different, and include different document feature decisions. Thus, the invention is not to be construed as being limited to the decision tree illustrated in FIG. 7, and other embodiments may also be employed. In any event, traversing the decision tree 700 generated based on the training set of documents provided is expected to provide a quality feature score for a given document. The quality feature score then may be used to identify whether to define a document as having sufficient subject matter specificity, or not.

To illustrate use of decision tree 700, consider a document in a search result having the following document features:

<wc:234><ph:6><nw:0.04><sym:0><lb:0.03><img: 0.01><fw:0.04><date:0>

From the input of the above document features, the document features are processed according to the decision tree 700's flow through to a leaf (740-745), and an overall quality feature score may be determined based on the outcome scores in the flow, as follows:

| Decision | Y/N | Score |
| --- | --- | --- |
| Word count < 123 | No | +.05 |
| LatinNonWord > 0.05 | No | +0.1 |
| Phonetic > 5 | Yes | −0.7 |

As shown in the table above, an overall quality feature score may be determined of −0.1. Where the trained classifier determined the quality threshold to be 0, this document would result in a quality feature score less than the threshold. Therefore, the document would be classified as having insufficient subject matter specificity (a bad) document. However, it is noted that each feature score may also be examined to determine whether it exceeds a feature threshold. In another embodiment, the feature scores may be combined using a weighted summation and compared to a modified quality threshold. Thus, the above is not to be construed as a limiting the invention, and other approaches may also be used.

As noted above, the invention is not limited to using a decision tree as a classifier, and other classifiers may also be used. Thus, for example, a variety of other machine learning algorithms may be used. Non-exhaustive examples including naïve Bayes, Support-Vector machines, logistic regression, perceptrons, Markovian discrimination approaches, neural networks, or the like.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A network device, comprising:
  a transceiver to send and receive data over a network; and
  a processor that is operative to perform actions, including:
    determining a plurality of document features for each document in a plurality of documents, wherein the plurality of documents include at least one document defined as having sufficient subject matter specificity, and at least one other document having insufficient subject matter specificity;
    training a document classifier based at least on the plurality of document features including at least a frequency of visual line breaks and a frequency of images for the at least one document having sufficient subject matter specificity;
    providing to the trained document classifier, the at least one other document, wherein the trained document classifier determines a first quality value for the at least one other document;
    if the first determined quality value of the at least one other document is above a quality threshold value, identifying the at least one other document to have sufficient subject matter specificity, and providing the at least one other document to a client device for display;
    if the first determined quality value of the at least one other document is at an unacceptable level, re-training the document classifier based on at least the plurality of features for the at least one other document; and
    if a second quality value of the at least one other document is determined by the retrained document classifier to be above the quality threshold, providing the at least one other document to the client device for display.

2. The network device of claim 1, wherein the plurality of document features further comprises at least one of a word count, a number of phonetics, a frequency of special characters, a number of special characters, and a frequency of function words, wherein the frequencies are determined based in part on the word count.

3. The network device of claim 1, wherein the document classifier comprises a decision tree that is trained based on the plurality of document features for each document in the plurality of documents.

4. The network device of claim 1, wherein identifying the at least one other document to have sufficient subject matter specificity further comprises traversing a decision tree, and combining feature scores as the decision tree is traversed.

5. The network device of claim 1, wherein the at least one other document comprises user generated content documents obtained during a search query.

6. The network device of claim 1, wherein the processor that is operative to perform actions, including:
  re-training the document classifier based at least in part on user feedback.

7. A system that is operative to manage a search query over a network, comprising:
  one or more processors having a search tool component configured to receive a search query request and to provide a plurality of documents in response; and
  one or more memory devices that store a document classifier that is configured to detect a document's subject matter specificity based on a plurality of document features about the document, wherein the document classifier performs actions, including:
    receiving a plurality of documents from the search tool; and
    for each document in the plurality of documents:
      extracting from each respective document, a plurality of document features including at least a frequency of visual line breaks and a frequency of images;

employing a machine learning algorithm to generate a document quality feature score for the respective document based on the extracted document features; and if the document quality feature score for the respective document is below a threshold value, removing the respective document from the received plurality of documents as indicating that the document has insufficient subject matter specificity; and providing a resulting set of at least one document to a search requestor based on each document quality feature score, such that the at least one provided document is determined to have sufficient subject matter specificity; and if the first determined quality value of the at least one document is at an unacceptable level, re-training the document classifier based on at least the plurality of features for the at least one document; and if a second quality value of the at least one other document is determined by the retrained document classifier to be above the quality threshold, providing the at least one document to the client device for display.

8. The system of claim 7, wherein the document classifier is generated based on a training process that comprises:

selecting a first set of documents that are identified as having sufficient subject matter specificity based at least on one feature characteristic of each document;

selecting a second set of documents that are identified as having insufficient subject matter specificity based at least on one feature characteristic of each document;

employing the first and second sets of documents to generate the machine learning algorithm.

9. The system of claim 7, wherein receiving a plurality of documents from the search tool further comprises receiving a plurality of documents associated with user generated content, wherein at least one document is associated with a blog site.

10. The system of claim 7, wherein the machine learning algorithm comprises at least one of a decision tree, naive Bayes algorithm, Support-Vector machine, logistic regression algorithm, a perceptron, a Markovian discrimination based algorithm, or a neural network.

11. The system of claim 7, wherein the document features further comprise at least one of a word count, a number of phonetics within a document, a frequency of special characters, a number of non-word symbols, and a frequency of function words.

12. A non-transitory computer-readable storage medium having computer-executable instructions, the computer-executable instructions when installed onto a computing device enable the computing device to perform actions, comprising:

receiving a plurality of documents in response to a search query; and for each document in the plurality of documents:

extracting from each respective document, a plurality of document features including at least a frequency of visual line breaks and a frequency of images;

employing a document classifier to generate a document quality feature score for the respective document based on the extracted document features;

if the document quality feature score for the respective document is below a threshold value, removing the respective document from the received plurality of documents as indicating that the document has insufficient subject matter specificity; and providing a resulting set of at least one document to a search requestor based on each document quality feature score, such that the at least one provided document is determined to have sufficient subject matter specificity; and if the first determined quality value of the at least one document is at an unacceptable level, re-training the document classifier based on at least the plurality of features for the at least one document; and if a second quality value of the at least one other document is determined by the retrained document classifier to be above the quality threshold, providing the at least one document to the client device for display.

13. The non-transitory computer-readable storage medium of claim 12, wherein employing the document classifier further comprises:

traversing a decision tree that is generated based on a training process using a plurality of training documents, wherein each of training documents are labeled as to a respective quality for subject matter specificity; and generating the overall document quality feature score based combining individual document feature scores determined as the decision tree is traversed.

14. The non-transitory computer-readable storage medium of claim 13, wherein the training process further comprises:

extracting from each of the plurality of training documents at least one document feature;

labeling each training document based on a quality for subject matter specificity; and generating the decision tree, including a decision flow, and feature scores using the labeled training documents and extracted document features.

15. The non-transitory computer-readable storage medium of claim 12, wherein the document features further comprise at least one of a word count, a number of phonetics within a document, a frequency of special characters, a number of non-word symbols, and a frequency of function words.

16. The non-transitory computer-readable storage medium of claim 12, wherein the search query is performed exclusively over user generated content sites.

17. A method of performing a search query, comprising:

receiving a plurality of documents in response to the search query over user generated content (UGC); and for each document in the plurality of documents:

extracting document features including at least a frequency of visual line breaks and a frequency of images from each respective document useable to identify subject matter specificity of a UGC document;

employing a document classifier to generate a first document quality feature score for the respective document based on the extracted document features; and if the first document quality feature score for the respective document is below a threshold value, removing the respective document from the received plurality of documents as indicating that the document has insufficient subject matter specificity; and providing a resulting set of at least one document to a search requestor based on each document quality feature score, such that the at least one provided document is determined to have sufficient subject matter specificity; and if the first determined quality value of the at least one document is at an unacceptable level, re-training the document classifier based on at least the plurality of features for the at least one document; and if a second quality value of the at least one document is determined by the retrained document classifier to be above the quality threshold, providing the at least other document to the client device for display.

18. The method of claim 17, wherein the UGC further comprises content from at least one blog site.

19. The method of claim 17, wherein the document classifier comprises a machine learning algorithm that is trained based on another set of UGC documents, wherein each of UGC document in the other set are labeled with a subject matter specificity quality value.

20. The method of claim 17, further comprising:
receiving user feedback regarding a subject matter specificity of the result set of documents; and employing the user feedback to modify the document classifier.

* * * * *